United States Patent
Radeztsky et al.

(10) Patent No.: US 10,825,225 B1
(45) Date of Patent: Nov. 3, 2020

(54) SIMULATION STREAM PIPELINE

(71) Applicant: Lucasfilm Entertainment Company Ltd. LLC, San Francisco, CA (US)

(72) Inventors: Ronald Radeztsky, Novato, CA (US); Michael Koperwas, San Francisco, CA (US)

(73) Assignee: LUCASFILM ENTERTAINMENT COMPANY LTD. LLC, San Francisco, CA (US)

( * ) Notice: Subject to any disclaimer, the term of this patent is extended or adjusted under 35 U.S.C. 154(b) by 0 days.

(21) Appl. No.: 16/359,732

(22) Filed: Mar. 20, 2019

(51) Int. Cl.
| | |
|---|---|
| G06T 13/20 | (2011.01) |
| G06T 13/40 | (2011.01) |
| G06T 17/10 | (2006.01) |
| G06T 15/04 | (2011.01) |
| A63F 13/69 | (2014.01) |
| G06T 1/60 | (2006.01) |

(52) U.S. Cl.
CPC .............. *G06T 13/40* (2013.01); *A63F 13/69* (2014.09); *G06T 1/60* (2013.01); *G06T 15/04* (2013.01); *G06T 17/10* (2013.01); *G06T 2210/16* (2013.01)

(58) Field of Classification Search
None
See application file for complete search history.

(56) References Cited

U.S. PATENT DOCUMENTS

| | | | | |
|---|---|---|---|---|
| 5,821,940 A | * | 10/1998 | Morgan ................. | G06T 17/00 345/420 |
| 2003/0001840 A1 | * | 1/2003 | Spitzer .................... | G06T 1/60 345/420 |
| 2004/0179013 A1 | * | 9/2004 | Menache ................ | G06T 11/00 345/473 |
| 2009/0167758 A1 | * | 7/2009 | Barczak .................. | G06T 17/20 345/420 |
| 2010/0033488 A1 | * | 2/2010 | Zhou ....................... | G06T 13/40 345/473 |
| 2011/0273456 A1 | * | 11/2011 | Coutinho ................ | G06T 13/20 345/473 |
| 2012/0185218 A1 | * | 7/2012 | Bickel ..................... | G06F 17/10 703/1 |
| 2013/0342527 A1 | * | 12/2013 | Molyneaux ........... | A63F 13/655 345/419 |
| 2015/0002517 A1 | * | 1/2015 | Lee ......................... | G06T 17/10 345/474 |
| 2016/0093084 A1 | * | 3/2016 | Sumner ................... | G06T 13/40 345/473 |
| 2017/0358118 A1 | * | 12/2017 | Bard ....................... | G06T 13/40 |
| 2018/0240271 A1 | * | 8/2018 | Chester .................. | G06T 17/20 |

\* cited by examiner

*Primary Examiner* — Sultana M Zalalee
(74) *Attorney, Agent, or Firm* — Sheppard Mullin Richter & Hampton LLP

(57) ABSTRACT

Some implementations of the disclosure are directed to a pipeline that enables real time engines such as gaming engines to leverage high quality simulations generated offline via film grade simulation systems. In one implementation, a method includes: obtaining simulation data and skeletal mesh data of a character, the simulation data and skeletal mesh data including the character in the same rest pose; importing the skeletal mesh data into a real-time rendering engine; and using at least the simulation data and the imported skeletal mesh data to derive from the simulation data a transformed simulation vertex cache that is usable by the real-time rendering engine during runtime to be skinned in place of the rest pose.

13 Claims, 8 Drawing Sheets

SIMULATION STREAM PIPELINE

DESCRIPTION OF THE RELATED ART

Animating dynamic objects such as characters (e.g., people or creatures) is a demanding area of animation that requires the animated object to move and deform in a visually plausible manner. Skinning of a skeleton-driven model is a technique used for animation of such objects. Skeletal animation is a computer animation technique that represents an object in two primary parts: 1) a mesh that is a surface representation of the object (e.g., defined by vertices, edges, and/or faces), and 2) a set of interconnected joints (i.e., a rig) used to animate the mesh. Generally, a joint may refer to a bone and the pivot about which it rotates, or a joint may just refer to a pivot. Joints may be related in a hierarchy by joint transformations. Skeletal animation may be applied to transform any object that implements this mesh and rig structure. For example, it may be applied to a whole or a part (e.g., arm, leg, hand, foot, torso) of an animated character, creature, or similar object. Alternatively, it may be applied to animations of other objects, such as clothing, a door, etc.

In order to achieve realistic animation of objects such as clothing, the skeletal mesh may require a very high resolution, including many different vertices that describe the mesh. As more detail is added to such an object, the cost of animating the object may become computationally prohibitive, reaching a point where the object cannot be dynamically animated at an acceptable framerate for live playback. Where offline simulation is acceptable (e.g., during film creation where off-line simulations may be run for many hours to create individual frames), content creators may be able to work around this limitation. On the other hand, in dynamic environments that are not statically rendered, including interactive virtual reality (VR) or augmented reality (AR) experiences, or video games, geometry changes may require computation in real-time. For example, consider an interactive VR experience including an animated VR character that is presented to a VR user. Although the VR character may generally behave in accordance with a script, certain actions by VR character may require real-time rendering, including the VR character's interactions with the user such as staring at the user, or changing physical shape in response to the user. As such, in such environments content developers may be obligated to present lower fidelity content in order to meet the real-time rendering requirement.

Principle component analysis (PCA), a technique used to reduce dimensionality of a data set, has been applied to animation (e.g., animating a three-dimensional face model) in order to address this problem. For example, applying PCA animation, principal animation components may be determined to decouple the animation from the underlying geometry, allowing for progressive animation compression. However, as character motions grow in complexity, PCA requires an increasing number of shapes in order to provide accurate reproduction, which again introduces computational limitations.

SUMMARY

Implementations of the disclosure are directed to a pipeline that enables real time engines (e.g., gaming engines) to leverage high quality simulations generated offline via film grade simulation systems.

In one embodiment, a method includes: obtaining simulation data and skeletal mesh data of a character, the simulation data and skeletal mesh data comprising the character in the same rest pose; importing the skeletal mesh data into a real-time rendering engine; and using at least the simulation data and the imported skeletal mesh data to derive from the simulation data a transformed simulation vertex cache that is usable by the real-time rendering engine during runtime to be skinned in place of the rest pose.

In implementations, using at least the simulation data and the imported skeletal mesh data to create a transformed simulation vertex cache that is usable by the real-time rendering engine during runtime to be skinned in place of the rest pose, includes: deriving a processed vertex cache comprising frames of vertex and index buffers, wherein deriving the processed vertex cache comprises: converting data extracted from the simulation data to frames of vertex and index buffers; and creating a mapping between vertices in the processed vertex cache and vertices in vertex buffers created in the real-time rendering engine by importing the skeletal mesh data.

In implementations, using at least the simulation data and the imported skeletal mesh data to create a transformed simulation vertex cache that is usable by the real-time rendering engine during runtime to be skinned in place of the rest pose, further includes: using at least the mapping to reorder the processed vertex cache.

In implementations, using at least the simulation data and the imported skeletal mesh data to create a transformed simulation vertex cache that is usable by the real-time rendering engine during runtime to be skinned in place of the rest pose, further includes: using at least the mapping to derive inverse-transformed tangent spaces computed on skinned vertex caches.

In implementations, creating a mapping between vertices in the processed vertex cache and vertices in the run time engine's vertex buffers, includes: comparing spatial poses and texture coordinates from a rest pose of the processed vertex cache and a rest pose of the imported skeletal mesh data to generate a mapping between vertices in the processed vertex cache and vertices in vertex buffers for the runtime engine's vertex buffers for the imported skeletal mesh data.

In implementations, deriving the processed vertex cache, includes: transforming the vertex and index buffers to a format suitable for the real-time rendering engine. In implementations, transforming the vertex and index buffers to a format suitable for the real-time rendering engine, includes one or more of the following operations: a scaling operation, a coordinate space conversion, a texture space conversion, a timing transformation, and a compression of tangent spaces.

In implementations, the simulation data includes a simulation file of the character in the rest pose and a simulation file of simulation and facial performance results of the character, where the animation data includes an animation file of a skeletal mesh model of the character in the rest pose and an animation file of animations of the skeletal mesh model.

In implementations, the real-time rendering engine is a game engine.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the present disclosure to the precise form disclosed.

DETAILED DESCRIPTION

As used herein, the term "virtual reality" or "VR" generally refers to a simulation of a user's presence in an environment, real or imaginary, such that the user may interact with it.

As used herein, the terms "mixed reality," "MR," "augmented reality," and "AR" generally refer to a view of a physical, real-world environment that is augmented or supplemented by computer-generated or digital information such as video, sound, and graphics. The digital information may be directly registered in the user's physical, real-world environment such that the user may interact with the digital information in real time or at interactive frame rates (e.g., 30, 60, 120, or 240 frames per second). The digital information may take the form of images, audio, haptic feedback, video, text, etc. For example, three-dimensional representations of virtual objects may be overlaid over the user's view of the real-world environment in real time.

As noted above, one of the advantages of offline simulation systems (e.g., film grade simulations) is that they permit the achievement of realistic animation of objects, including clothing. On the other hand, real-time simulations may be limited to gaming engines that provide lower fidelity content because of the real-time rendering requirement. As such there may be a wide gap between what can be done in real time by gaming engines and what may be done in a film pipeline for an offline simulation. It would be advantageous to utilize film quality simulations in a real-time environment.

To this end, implementations of the disclosure are directed to a pipeline that enables real time engines (e.g., gaming engines) to leverage high quality simulations generated offline via film grade simulation systems. In accordance with implementations, further described below, vertex caches for simulations (e.g., clothing simulations) generated by a simulation system may be processed into a form usable by a real-time engine. This processing may include transforming vertex caches associated with a simulation of an object into vertex buffers that may be processed by the real-time engine.

In some implementations, the processed simulations may be combined with skeletal animations to generate high fidelity, real-time content. For example, instead of skinning the regular rest pose of a character, an inverse transformed simulation result may be skinned itself and carried along during real-time animation. By virtue of such implementations, the results of running a clothing simulation may be transformed in such a way that when a skeletal mesh of a character performs motions that were not in the original simulation, the results of the clothing simulation rather than the rest pose of the character are applied to the skeletal mesh of the character.

Figure 1:
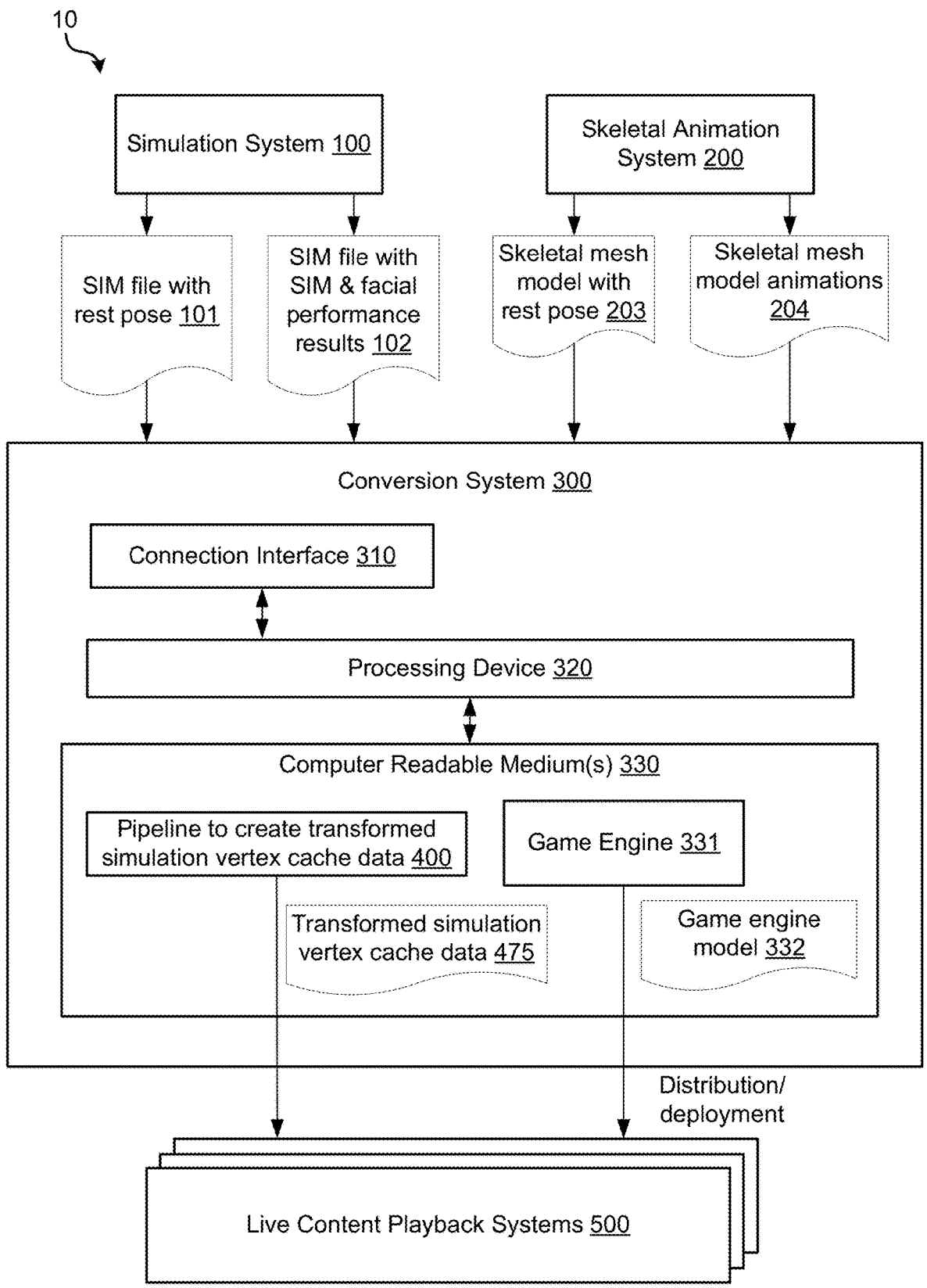
FIG. 1 is a diagram illustrating an example environment in which the technology described herein may be implemented.

FIG. 1 is a diagram illustrating an example environment 10 in which the technology described herein may be implemented. As illustrated, environment 10 may include a simulation system 100, a skeletal animation system 200, a conversion system 300, and one or more live content playback systems 500.

Simulation system 100 may be configured to perform a simulation on an object (e.g., clothing) to generate one or more simulation files of frames of moving meshes. The generated simulation file(s) may be high fidelity files that were not generated in real time (e.g., offline during film creation).

Simulation system 100 may perform the same skeletal animation steps as a skeletal animation system (e.g., system 200) using the same animation data used by a skeletal animation system (e.g., files 203 and 204 of system 200), while simultaneously running a full physics simulation on the clothing, and also applying facial performance capture data to the mesh. These simulation and facial performances may be stored as a series of frames containing snapshots of the mesh. As illustrated in the example of FIG. 1, two simulation files may be generated: a simulation file 101 with a rest pose of a character and a simulation file 102 with simulation and/or facial performance results of the character.

The rest pose of simulation file 101 may match a rest pose of a skeletal mesh model (e.g., file 203) but in a different file format.

The simulation file(s) may comprise mesh configuration data for each frame for each simulation point in time. For example, the simulation data may include a description what types of frames are present, at what time (e.g., time code) they are present within the simulation, and polygonal meshes or sub divisional meshes for each frame. Each of the frames associated with the simulation file(s) may describe a location of each vertex on the mesh associated with the simulated object. The generated simulation file(s) may not be in a form suitable for real time playback (e.g., suitable for efficient runtime use by a game engine). For example, the generated simulation file(s) may not include any rig data.

Skeletal animation system 200 may be configured to create one or more skeletal animation files associated with skeletal animation of a character (e.g., a human, an animal, etc.) For example, the one or more skeletal animation files may include a file 203 having a skeletal mesh model with a rest pose and rig data, and a file 204 having skeletal mesh model animations 204 that may be applied to the rest post and intermediary poses. A rest pose may refer to the pose that the object mesh is in when the joints are bounded to the mesh (i.e., the skin is initialized and object is ready for skinning). For example, if the object is a character, the rest pose may be the character with arms stretched out in the "T" position or the character with arms stretched out at the sides of its body. The skeletal mesh model animations may refer to the bone/joint transformations that occur to the character during a performance (e.g., when the character moves around).

Conversion system 300 may include a connection interface 310, a processing device, and one or more computer readable medium(s) 330. Connection interface 310 may be to communicatively couple conversion system 300 to simulation system 100, skeletal animation system 200, and/or one or more live content playback system(s) 500. For example, connection interface 310 may be to receive files 101, 102 203, and 204, and/or to transmit files 475 and 332. In some implementations, connection interface 310 may be implemented as a wired interface (e.g., an HDMI interface, a USB interface such as a USB Type-C interface, a THUNDERBOLT interface, an Ethernet interface, etc.) In some implementations, connection interface 310 may be implemented as a wired interface (e.g., a WiFi communications interface, a cellular communications interface, a satellite communications interface, etc.). In some implementations, connection interface 310 may comprise a combination of both wired and wireless interfaces.

The one or more computer readable mediums 330 may store a pipeline 400 to create transformed simulation vertex cache data and a game engine 331. The pipeline 400 may be implemented as one or more instructions that are executable by processing device 320 to use simulation file(s) (e.g., files 101-102) to create transformed simulation vertex cache data 475. As further described below, pipeline 400 of conversion system 300 may be configured to prepare the generated simulation file(s) (e.g. files 101 and 102) in a suitable format for playback on a runtime system. The data may be in a format suitable for film rendering. For example, the data may have separately indexed UV data (e.g., data for texture mapping a 2D image to a 3D model's surface), quad-based meshes, and no normals or tangents. As noted above, file 101 may contain the same rest pose as file 203, but in a different file format (e.g., file 102). Although they are processed through different import pipelines, because these two files may contain the same pose, that may be used by pipeline 400 to match the two sets of simulation and animation data.

The game engine 331 may be configured to import a skeletal mesh model with rest pose 203 and skeletal mesh model animations 204 to generate real-time game engine model 332.

It should be noted that although conversion system 300 is illustrated as one device in this example, in some embodiments it may be implemented as multiple devices. For example, pipeline 400 and game engine 331 may be implemented on separate devices.

Figure 2:
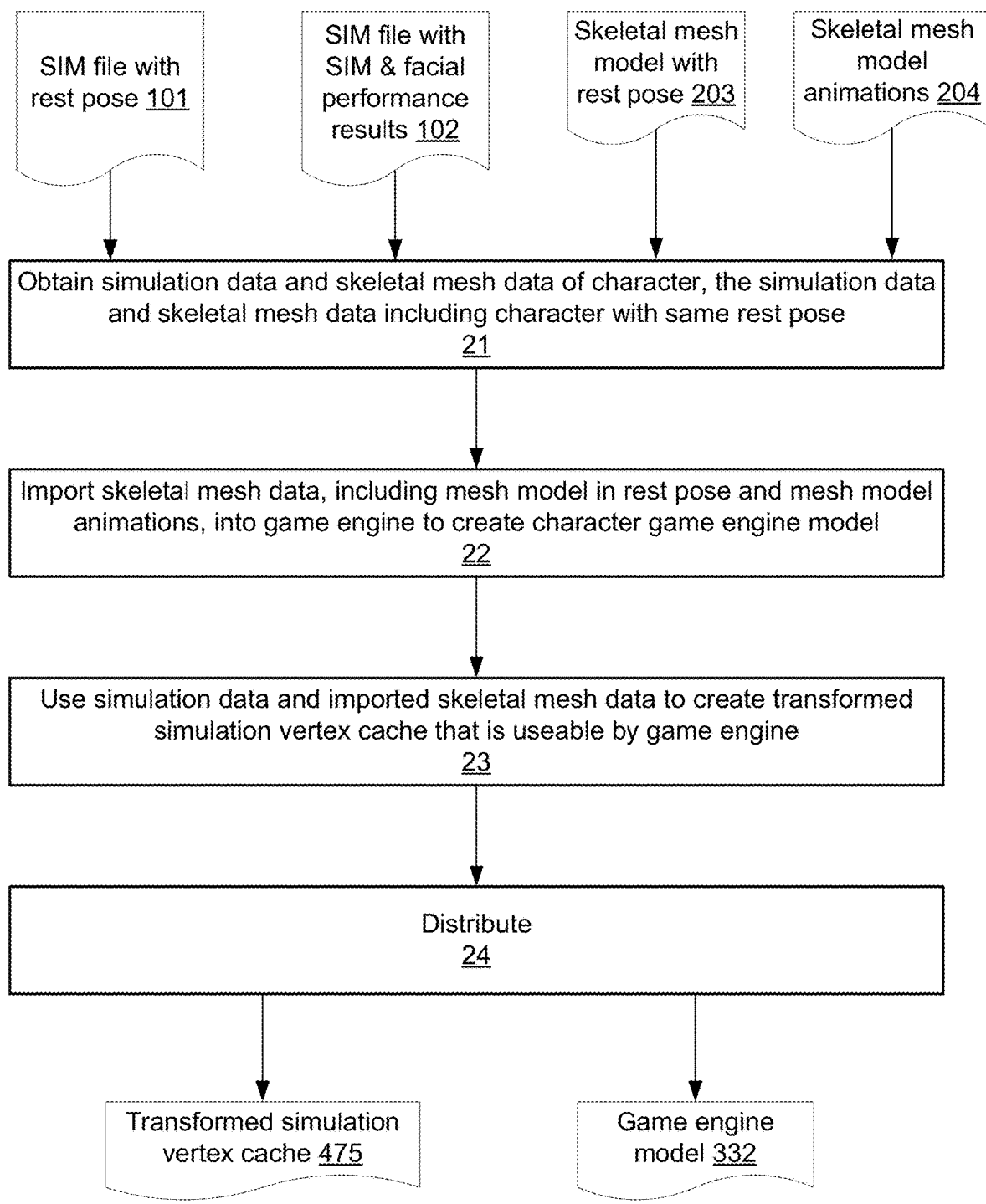
FIG. 2 is an operational flow diagram illustrating an example method that may be implemented by the conversion system of FIG. 1, in accordance with implementations of the disclosure.

FIG. 2 is an operational flow diagram illustrating an example method 200 that may be implemented by conversion system 300 of FIG. 1, in accordance with implementations of the disclosure. At operation 21, conversion system 300 obtains simulation data and skeletal mesh data of a character, the simulation data and skeletal mesh data each respectively including data of the character in the same rest pose. For example, conversion system 300 may obtain simulation files 101-102 and skeletal mesh animation files 203-204.

At operation 22, game engine 331 of conversion system 300 imports the skeletal mesh model with the rest post 203 (e.g., including rig data) and the skeletal mesh model animations 204 into the game engine 331 to create a game engine model 332 of a character associated with the skeletal mesh model. In some implementations, the skeletal mesh model in the rest pose 203 and the skeletal mesh animations 204 may be separate files. In other implementations they may be the same file. In some implementations of operation 22, game engine 331 may also import important material(s), texture(s), and other properties associated with the mesh model.

At operation 23, conversion system 300 uses at least the obtained simulation data and imported skeletal mesh data to create a transformed simulation vertex cache 475 of the simulation data that is usable by a game engine during animation of the mesh model. For example, the transformed simulation vertex cache 475 may be usable by a game engine 331 or a game engine of a live content playback system 500. To this end, although the simulation data and skeletal mesh data are processed through different import pipelines, because these two sets of data contain the same character rest poses (albeit in different file formats), they may be used to match the two sets of simulation and animation data. Particular implementations of doing so are further described below with reference to FIGS. 3-9.

It should be noted that although operation 23 illustrated as occurring after operation 22 in this example, in some instances certain steps of operation 23 may occur before operation 22 or parallel to operation 22.

At operation 24, conversion system 300 distributes the created transformed simulation vertex cache 475 and game engine model 332 for deployment on one or more content playback systems 500. Each content playback system may include a real-time renderer (e.g., a real-time game engine renderer) that may combine the processed simulations (i.e., transformed simulation vertex cache 475) with the skeletal animations of the game engine model 332 to generate high fidelity, real-time content. The transformed simulation vertex cache 475 may be in a form that can be loaded frame by frame off of a high speed storage drive (e.g., solid state drive) and transferred directly into a GPU memory right before skinning occurs, substituting the rest pose of the skeletal object with each frame of the vertex cache that is coming in. The system may skin the transformed simulation vertex cache 475 and have the rendering data calculated on it.

For example, in some implementations, a live content playback system 500 may be configured to provide an interactive VR or AR experience. In such implementations, real time playback of VR or AR content may be enhanced by combining the high quality pre-simulated results of simulation system 100 (in the form of transformed simulation vertex cache 475) with the animated character that reacts. For example, as part of the VR experience a high quality clothing simulation of a character may be leveraged during dynamic rendering of the character's movements. As another example, in some implementations a live content playback system 500 may be configured to enhance film production and/or television production by playing back enhanced images in a real-time engine.

Figure 3:
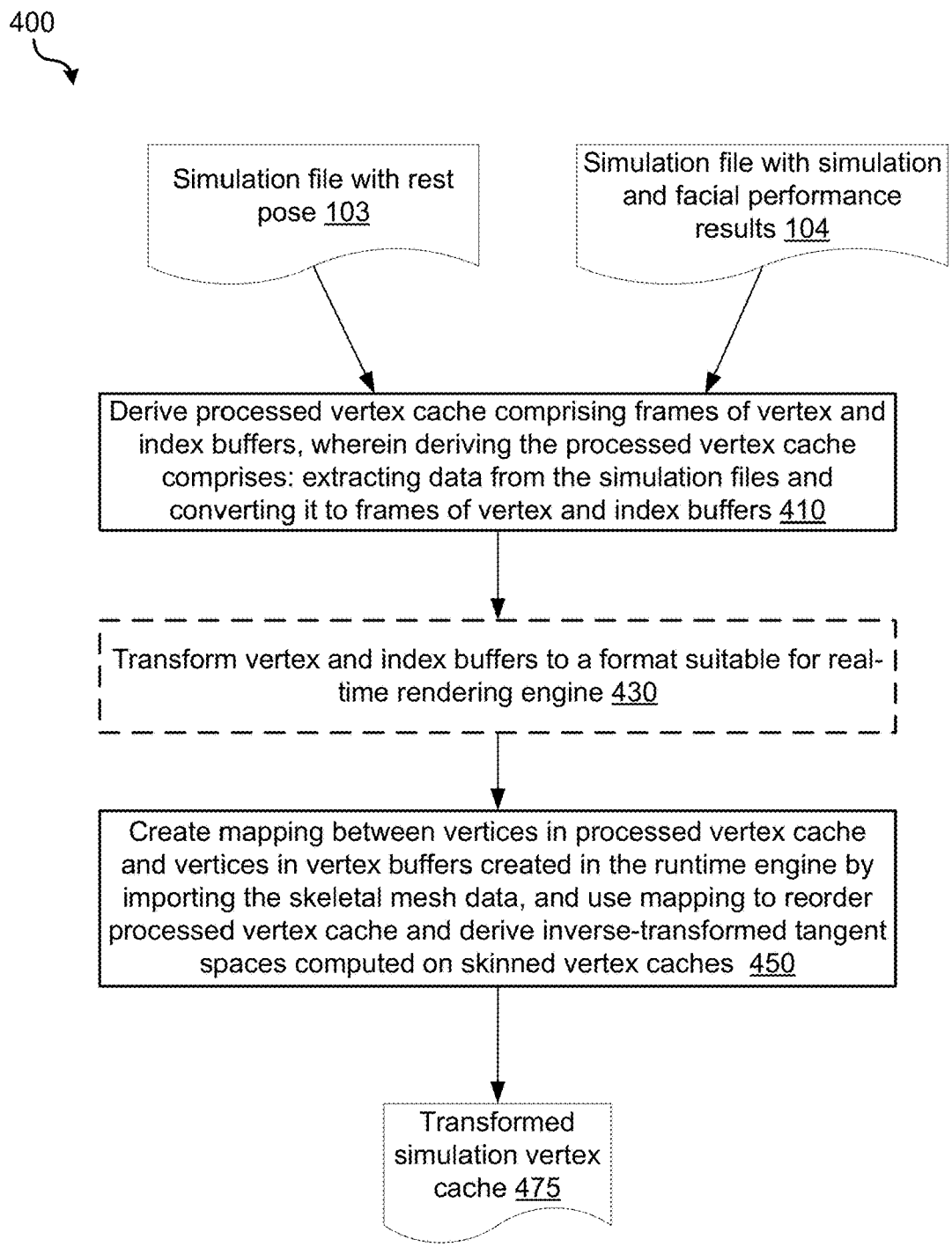
FIG. 3 is an operational flow diagram illustrating an example method that may be implemented to take as inputs simulation data and imported skeletal mesh data of a character, where the simulation data and skeletal mesh data include the character in the same rest pose, and output a transformed simulation vertex cache that is usable by a real-time game engine, in accordance with implementations of the disclosure.

FIG. 3 is an operational flow diagram illustrating an example method 400 that may be implemented to take as inputs simulation data and imported skeletal mesh data of a character, where the simulation data and skeletal mesh data include the character in the same rest pose, and output a transformed simulation vertex cache 475 that is usable by a real-time game engine, in accordance with implementations of the disclosure. For example, method 400 may be implemented by a processing device 320 executing instructions of pipeline 400.

Beginning with operation 410, the simulation data may need to be converted to take it from a general mesh description to a real-time engine description. To this end, at operation 410, a processed vertex cache comprising frames of vertex data (e.g., vertices that may be drawn) and index buffers comprising index data may be deriving by converting data extracted from the simulation files into frames of vertex and index buffers. Stated another way, the mesh configuration data for each frame that is time indexed for each simulation point in time may be converted to frames of vertex and index buffers.

The vertex data of the vertex buffer may include for the vertices of each frame: position data, tangent space data, texture coordinates (i.e., UV coordinates), color data, and other data. The index buffer may store vertex buffer index values that reference a particular value within the vertex buffer. The frames of vertex and index buffers may be suited for real-time rendering, grouped appropriately for draw calls per material, using triangle-based rendering with combined vertex data and full compressed tangent spaces, taking into account vertex splits due to UV assignments.

In implementations, operation 410 may be performed for both the simulation file with rest pose 103 and the simulation file with simulation and facial performance results 104. For example, the rest pose may be processed identically to a one-frame simulation file. In implementations, file 104 may be a compact representation of the animation comprising only frames of vertex buffers, but no index frame, whereas the rest pose file 103 comprises a vertex buffer of the rest pose and an index buffer. In such implementations, the rest post file 103 may provide the indexing information for file 104.

Figure 4:
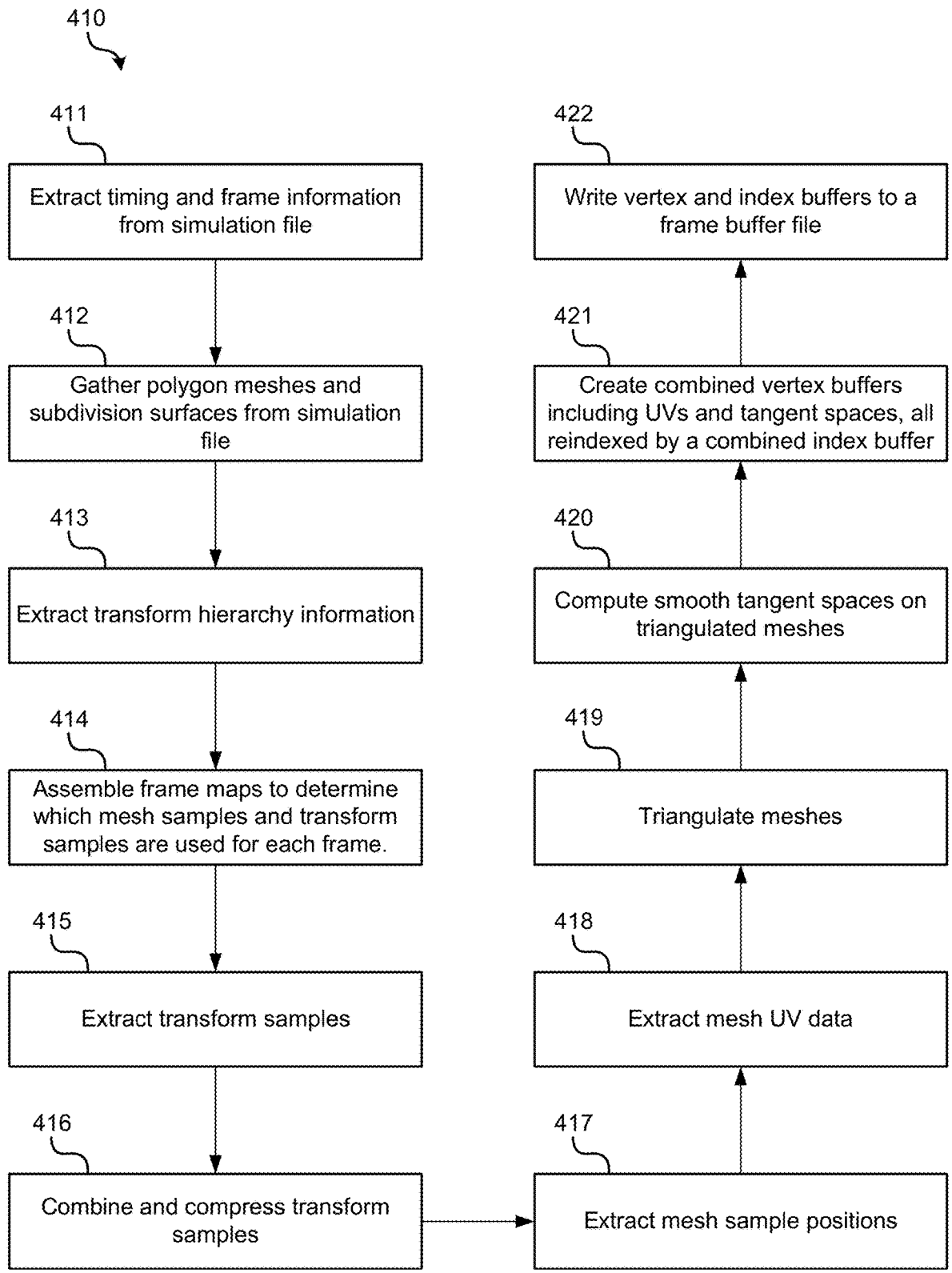
FIG. 4 is an operational flow diagram illustrating a particular implementation of an operation of deriving from simulation data a processed vertex cache comprising frames of vertex and index buffers, in accordance with implementations of the disclosure.

FIG. 4 is an operational flow diagram illustrating a particular implementation of an operation 410 of deriving from simulation data a processed vertex cache comprising frames of vertex and index buffers, in accordance with implementations of the disclosure. For example operation 410 may be performed using a simulation file with rest pose 103 and a simulation file with simulation and facial performance results 104. It should be noted that in some implementations only a subset of operations of operation 410 may need to be performed to obtain the needed frames of vertex and index buffers. Moreover, it should be noted that the operations do not necessarily need to performed in the illustrated order.

At operation 411, timing and frame information is extracted from the simulation data. At operation 412, polygon meshes and subdivision surfaces are gathered from the simulation data. At operation 413, hierarchy information is extracted from the simulation data. At operation 414, frames maps are assembled to determine which mesh samples and transform samples are used for each frame. At operation 415, transform samples are extracted from each frame of the simulation data. At operation 416, the extracted transform samples are combined and compressed. At operation 417, mesh sample positions are extracted from the simulation data. At operation 418, mesh UV data (e.g., texture coordinates) is extracted from the simulation data to derive a buffer of position coordinates and a buffer of texture coordinates. At operation 419, the meshes are triangulated using the extracted mesh sample positions and the index buffer data. At operation 420, smooth tangent spaces are computed on the triangulated meshes. At operation 421, combined vertex buffers, including UVs and tangent spaces, are created, all reindexed by a combined index buffer. At operation 422, the vertex and index buffers are written to a frame buffer file.

Referring again to FIG. 3, following operation 410, most of the transformations for real-time rendering may have been applied, but vertex and index buffers of the processed vertex cache may not necessarily be in the format of any particular real-time engine. To prepare for rendering in the utilized real-time engine, engine-specific transformations may need be applied. To this end, at optional operation 430, the vertex and index buffers may be transformed to a format suitable for the real-time rendering engine. In other implementations (e.g., where the output of 410 is in a format suitable of the used real-time engine), operation 430 may be skipped.

Figure 5:
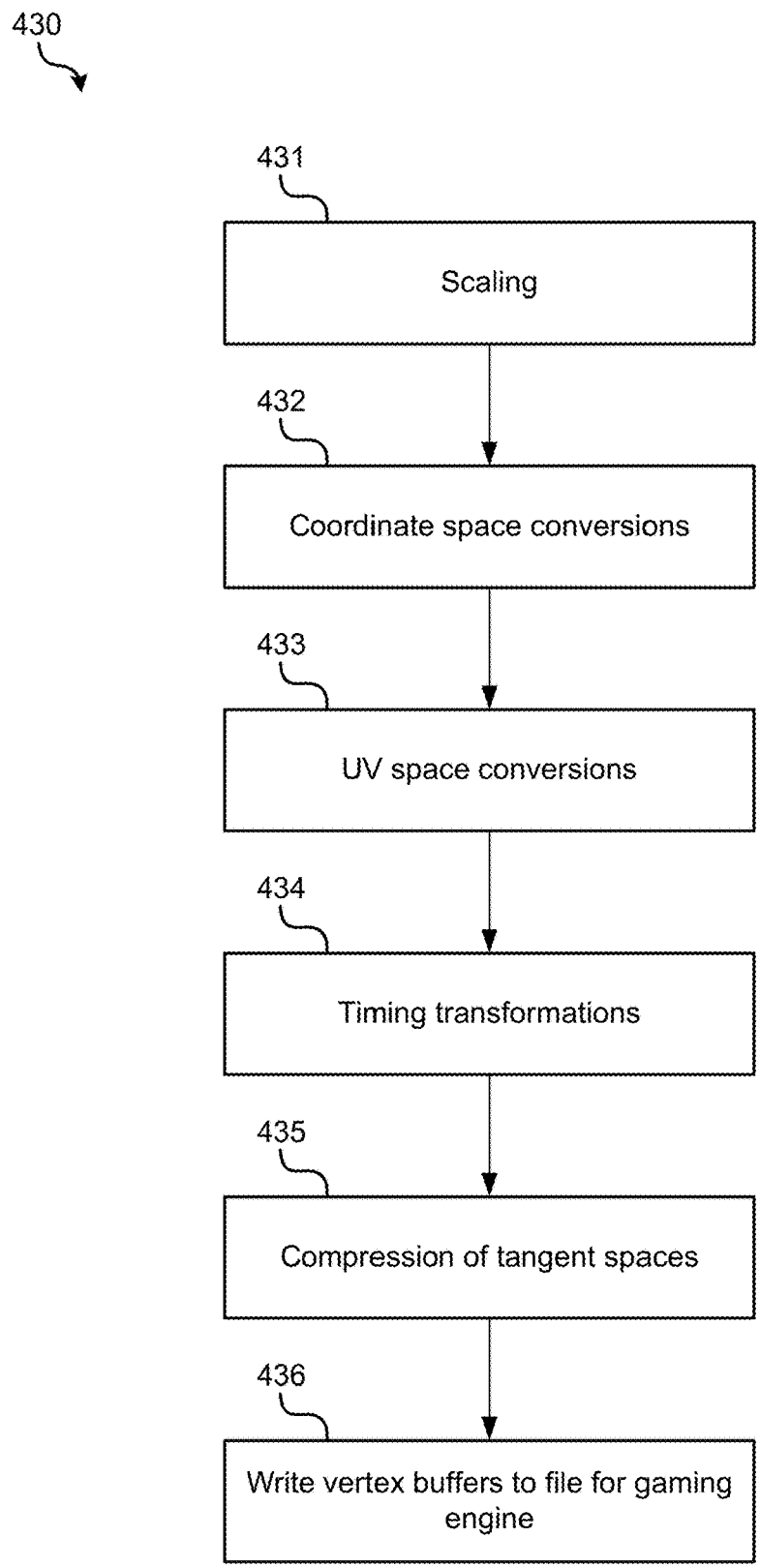
FIG. 5 is an operational flow diagram illustrating a particular implementation of an operation of transforming vertex and index buffers to a format suitable for a real-time rendering engine, in accordance with implementations of the disclosure.

FIG. 5 is an operational flow diagram illustrating a particular implementation of an operation 430 of transforming the vertex and index buffers transformed to a format suitable for a real-time rendering engine, in accordance with implementations of the disclosure. In implementations, operation 430 may be performed for the vertex and index buffers created for each the simulation file with rest pose 103 and the simulation file with simulation and facial performance results 104. It should be noted that depending on the real-time rendering engine that is utilized, in some implementations only a subset of operations of operation 430 may need to be performed or operation 430 may be skipped entirely. Moreover, it should be noted that the operations do not necessarily need to performed in the illustrated order.

At operation 431, scaling may be applied. For example, data may be converted to a suitable unit format (e.g., from feet to centimeters) such that the units of the simulation data match the units used by the real-time rendering engine. At operation 432, coordinate space conversions are applied. For example, the coordinate system of the simulation data may be converted so it matches a coordinate system used by the real-time rendering engine. At operation 433, UV space conversions are applied. At operation 434, timing transformations are applied. At operation 435, a compression of the tangent spaces is applied. At operation 436, vertex buffers are written to a file that may be loaded by the real-time rendering engine.

Following operation 410 and, optionally, operation 430, if straight simulation buffers were being played back, the data may be loaded and rendered. However, in the case of skinned characters, because the data is not being rendered directly, but instead being applied to an existing skeletal mesh character imported into a game engine by a traditional pipeline, two additional problems may need to be addressed. First, the traditional pipeline may have produced a different vertex ordering compared to the vertex ordering produced from the pipeline 400, including operations 410 and 430. Second, although the pipeline 400 computed tangent spaces on the pre-skinning vertex caches, correct tangents spaces are needed on the skinned result. Although the pre-skinning and post-skinning tangent spaces may be equivalent, because the pre-skinning simulation meshes may often contain very extreme local distortions due to rapidly varying bone weights, it may be preferable to perform the tangent-space calculations on the final skinned result and then inverse transform those tangent spaces to produce correct pre-skinning tangent spaces, that when forward skinned, would recover the correct result.

To this end, at operation 450, a mapping may be created between vertices in the processed vertex cache and vertices in vertex buffers created in the runtime engine by importing the skeletal mesh data, and the mapping may be used to reorder the simulation vertex cache and derive inverse-transformed tangent spaces computed on skinned vertex caches.

Figure 6:
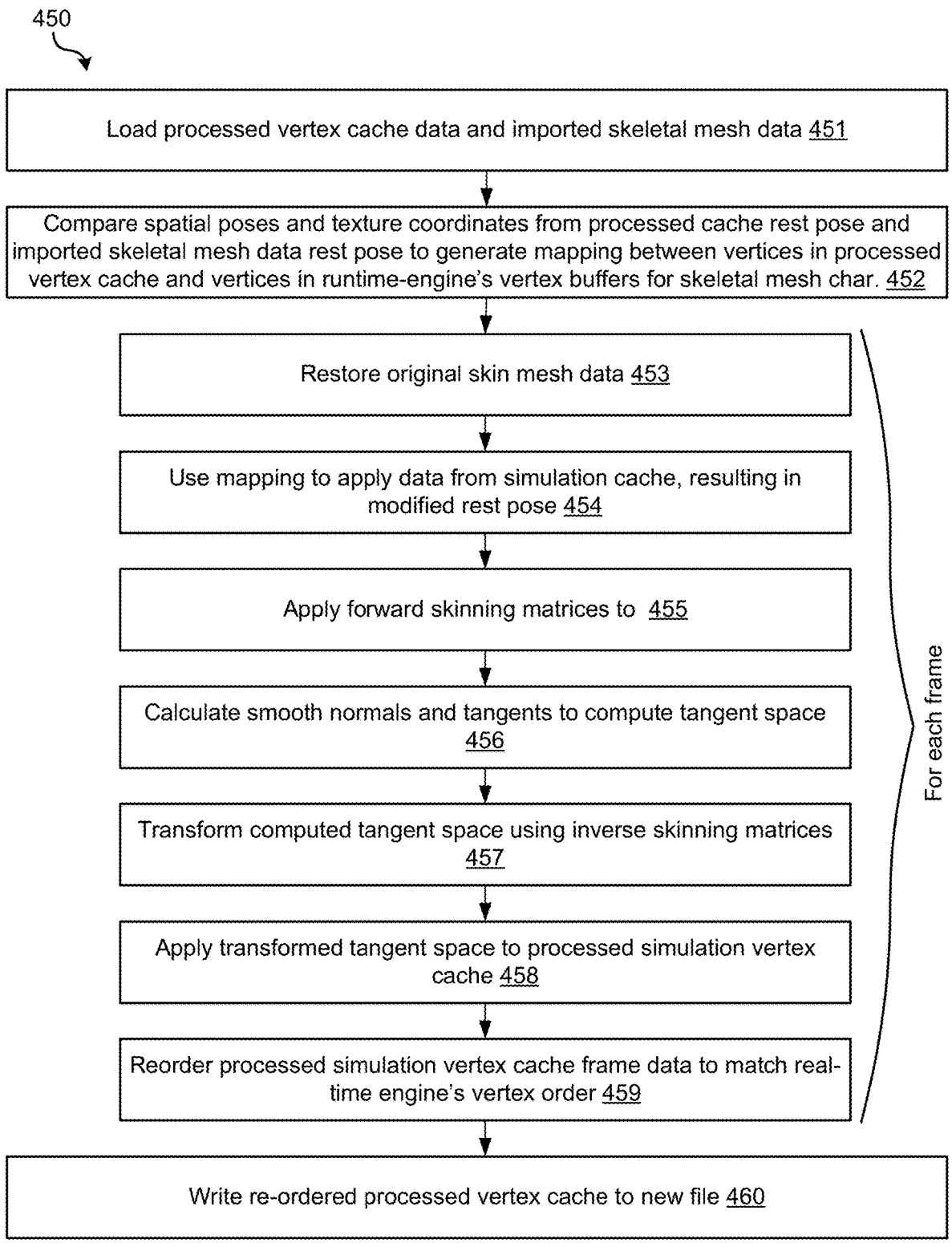
FIG. 6 is an operational flow diagram illustrating a particular implementation of creating a mapping between vertices in a processed vertex cache derived simulation data and vertices in vertex buffers created in a runtime engine by importing skeletal mesh data, and using the mapping to reorder the processed vertex cache and derive inverse-transformed tangent spaces computed on skinned vertex caches, in accordance with implementations of the disclosure.

FIG. 6 is an operational flow diagram illustrating a particular implementation of an operation 450, in accordance with implementations of the disclosure. At operation 451, the processed vertex cache data and imported skeletal mesh data may be loaded into the runtime engine. At operation 452, spatial poses and texture coordinates (e.g., UV coordinates) from the processed cache rest pose and the imported skeletal mesh data rest pose may be compared, generating a mapping between vertices in the buffers of the processed vertex cache and vertices in the buffers for the imported skeletal mesh data (e.g., skeletal mesh character). Thereafter, for each frame in the animation and corresponding frame in the processed simulation cache, a series of processing operations 453-459 may be performed.

At operation 453, the original skeletal mesh data may be restored. At operation 454, data from the simulation cache buffer may be applied using the mapping from operation 452, resulting in a modified rest pose that when skinned, produces a simulated result. At operation 455, forward skinning matrices are applied for the frame, produced a desired animated and simulated final spatial pose. At operation 456, smooth normals and tangents are calculated on the final pose to compute a tangent space. At operation 457, the computed tangent space is transformed using inverse skinning matrices, producing a tangent-space that when forward skinned at runtime, may produce a desired final tangent space on the skinned mesh. At operation 458, the transformed tangent space data is applied to the processed simulation vertex cache. At operation 459, the processed simulation vertex cache frame data is reordered to match the real-time engine's vertex order, allowing for direct substitution at run-time. By virtue of this ordering, the index buffer of the processed vertex cache is no longer needed.

Following the processing of each frame, at operation 460 the re-ordered processed vertex cache may be written to one or more new files (i.e., as transformed simulation vertex cache 475). Following operation 450, the transformed simulation vertex cache 475 may be in a form (e.g., data arrays) that may be streamed frame-by-frame at run-time, and loaded directly into a graphical processing unit to be skinned in place of the rest pose. This produces the desired result of a real-time animated character with offline movie-quality simulations and facial performances that may still respond to real-time modifications to the animation, such as looking at or turning towards a character controlled by a live participant.

Figure 7:
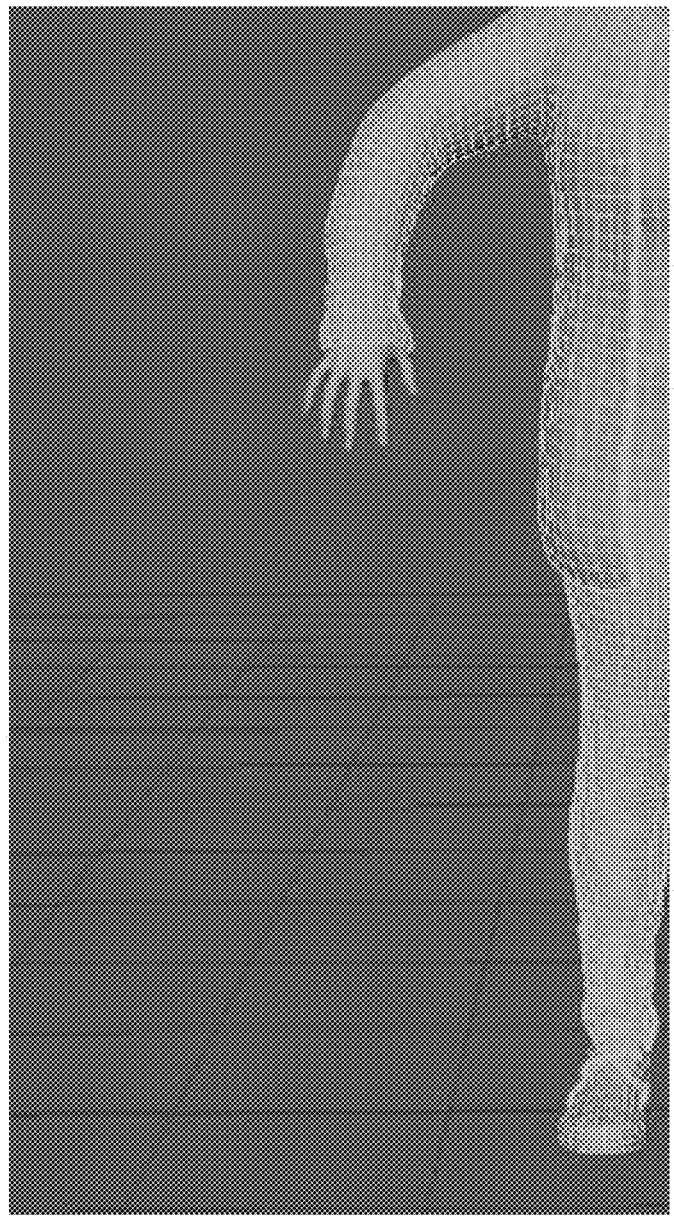
FIG. 7 illustrates a portion of a mesh model of clothing applied over a character in the rest pose prior to implementing the pipeline described herein.

FIG. 7 illustrates a portion of a mesh model of clothing applied over a character in the rest pose prior to performing pipeline 400. For example, FIG. 7 may correspond to the type of data found in the simulation file with rest pose 101 and skeletal mesh model with rest pose 203, described above. In the form of file 203, this mesh may be imported into game engine 331 along with the skeletal mesh model animations 204 to create game engine model 332. This model may contain a skeletal rig and bone weighting information such that when the skeleton is animated in a conventional way using the imported animation data from file 204, the mesh may smoothly deform to reproduce the desired motions of the character, such as walking around, interacting with other objects, and/or speaking. In addition to the imported animation data from file 204, the character may also, in real time, apply procedural adjustments to the animated skeleton in order to achieve a desired result based on user input, such as looking at the user's position. When the rest pose in FIG. 7 is skinned in this way, the clothing portions of the mesh deform smoothly along with the other parts of the mesh according to the bone weights. In doing so, they remain tightly bound to the body of the character, and may not exhibit physically realistic secondary motions that would be produced by the physical simulation system 100.

Figure 8:
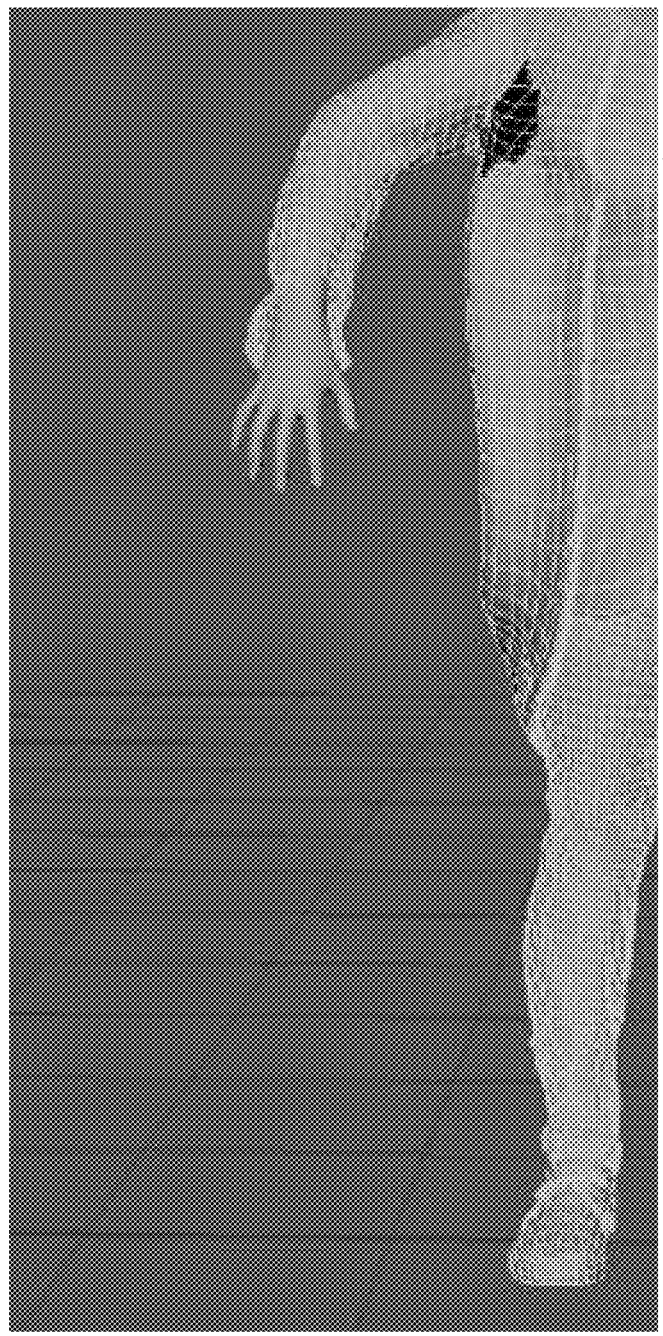
FIG. 8 illustrates a portion of a mesh model of clothing applied over a character in the rest pose after performing the pipeline described herein.

FIG. 8, by contrast, illustrates a portion of a mesh model of clothing applied over a character in the rest pose after performing pipeline 400. For example, FIG. 8 may correspond to the type of data that may be found in the transformed simulation vertex cache data file 475, discussed above. As alluded to above, simulation system 100 may perform the same skeletal animation steps that will be performed in the live content playback system 500, using the same animation data found in files 203 and 204, while simultaneously running a full physics simulation on the clothing, and also applying facial performance capture data to the mesh. These simulation and facial performances may be stored as a series of frames containing snapshots of the mesh in files 101 and 102. While the simulation system 100 may produce film quality simulations, it may not run in real time.

After processing with pipeline 400 in conversion system 300, the resulting transformed simulation vertex cache data file 475 may contain pre-skinning vertex buffer snapshots ready for loading into a GPU rendering system within the live content playback systems 500. Because of the process performed in stage 450 of process 400, the vertex buffers contain inverse transformed tangent spaces, so that when they are skinned in the live content playback systems 500, the resulting meshes may contain correct smooth tangent spaces for rendering, along with recovering the simulated motions and facial performances that existed during the simulation processes in simulation system 100. By virtue of this procedure, a real-time rendering of expensive full-quality simulations and facial animation procedures from simulation system 100 may be obtained. In addition, in the same manner as for the rest pose in FIG. 7, the transformed simulated vertex cache data 475 may be skinned by a skeleton containing interactive modifications, allowing the realistic simulated mesh to be applied to a character achieving desired interactive goals, such as looking at the user's position while speaking.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer readable medium having executable instructions stored thereon, that when executed by a processor, performs operations comprising:
   obtaining simulation data and skeletal mesh data of a character, the simulation data and skeletal mesh data comprising the character in the same rest pose;
   importing the skeletal mesh data into a real-time rendering engine; and
   deriving, using at least the simulation data and the skeletal mesh data imported into the real-time rendering engine, a transformed simulation vertex cache that is usable by the real-time rendering engine during runtime to be skinned in place of the rest pose, wherein deriving the transformed simulation vertex cache comprises:
      deriving a processed vertex cache comprising frames of vertex and index buffers, wherein deriving the processed vertex cache comprises converting at least some of the simulation data to the frames of vertex and index buffers;
      creating a mapping between vertices in the processed vertex cache and vertices in vertex buffers created in the real-time rendering engine by importing the skeletal mesh data; and
      using at least the mapping to reorder the processed vertex cache and derive inverse-transformed tangent spaces computed on skinned vertex caches.

2. The non-transitory computer readable medium of claim 1, wherein creating the mapping comprises: comparing spatial poses and texture coordinates from a rest pose of the processed vertex cache and a rest pose of the skeletal mesh data imported into the real-time rendering engine.

3. The non-transitory computer readable medium of claim 1, wherein deriving the processed vertex cache, comprises: transforming the vertex and index buffers to a format suitable for the real-time rendering engine.

4. The non-transitory computer readable medium of claim 3, wherein transforming the vertex and index buffers to the format suitable for the real-time rendering engine, comprises one or more of the following operations: a scaling operation, a coordinate space conversion, a texture space conversion, a timing transformation, and a compression of tangent spaces.

5. The non-transitory computer readable medium of claim 1, wherein the simulation data comprises a simulation file of the character in the rest pose and a simulation file of simulation and facial performance results of the character, wherein the skeletal mesh data comprises an animation file of a skeletal mesh model of the character in the rest pose and an animation file of animations of the skeletal mesh model.

6. The non-transitory computer readable medium of claim 1, wherein the real-time rendering engine is a game engine.

7. A method comprising:
obtaining simulation data and skeletal mesh data of a character, the simulation data and skeletal mesh data comprising the character in the same rest pose;
importing the skeletal mesh data into a real-time rendering engine; and
deriving, using at least the simulation data and the skeletal mesh data imported into the real-time rendering engine, a transformed simulation vertex cache that is usable by the real-time rendering engine during runtime to be skinned in place of the rest pose, wherein deriving the transformed simulation vertex cache comprises:
deriving a processed vertex cache comprising frames of vertex and index buffers, wherein deriving the processed vertex cache comprises converting at least some of the simulation data to frames of the vertex and index buffers;
creating a mapping between vertices in the processed vertex cache and vertices in vertex buffers created in the real-time rendering engine by importing the skeletal mesh data; and
using at least the mapping to reorder the processed vertex cache and derive inverse-transformed tangent spaces computed on skinned vertex caches.

8. The method of claim 7, wherein creating the mapping comprises: comparing spatial poses and texture coordinates from a rest pose of the processed vertex cache and a rest pose of the skeletal mesh data imported into the real-time rendering engine.

9. The method of claim 7, wherein deriving the processed vertex cache, comprises: transforming the vertex and index buffers to a format suitable for the real-time rendering engine.

10. The method of claim 9, wherein transforming the vertex and index buffers to the format suitable for the real-time rendering engine, comprises one or more of the following operations: a scaling operation, a coordinate space conversion, a texture space conversion, a timing transformation, and a compression of tangent spaces.

11. The method of claim 7, wherein the simulation data comprises a simulation file of the character in the rest pose and a simulation file of simulation and facial performance results of the character, wherein the skeletal mesh data comprises an animation file of a skeletal mesh model of the character in the rest pose and an animation file of animations of the skeletal mesh model.

12. The method of claim 7, wherein the real-time rendering engine is a game engine.

13. A system, comprising:
a processor; and
a non-transitory computer readable medium having executable instructions stored thereon, that when executed by the processor, performs operations comprising:
obtaining simulation data and skeletal mesh data of a character, the simulation data and skeletal mesh data comprising the character in the same rest pose;
importing the skeletal mesh data into a real-time rendering engine; and
deriving, using at least the simulation data and the skeletal mesh data imported into the real-time rendering engine, a transformed simulation vertex cache that is usable by the real-time rendering engine during runtime to be skinned in place of the rest pose, wherein deriving the transformed simulation vertex cache comprises:
deriving a processed vertex cache comprising frames of vertex and index buffers, wherein deriving the processed vertex cache comprises converting at least some of the simulation data to frames of the vertex and index buffers;
creating a mapping between vertices in the processed vertex cache and vertices in vertex buffers created in the real-time rendering engine by importing the skeletal mesh data; and
using at least the mapping to reorder the processed vertex cache and derive inverse-transformed tangent spaces computed on skinned vertex caches.

* * * * *